July 11, 1939.  B. C. PLACE  2,165,412
FASTENER
Filed March 21, 1936   2 Sheets-Sheet 2
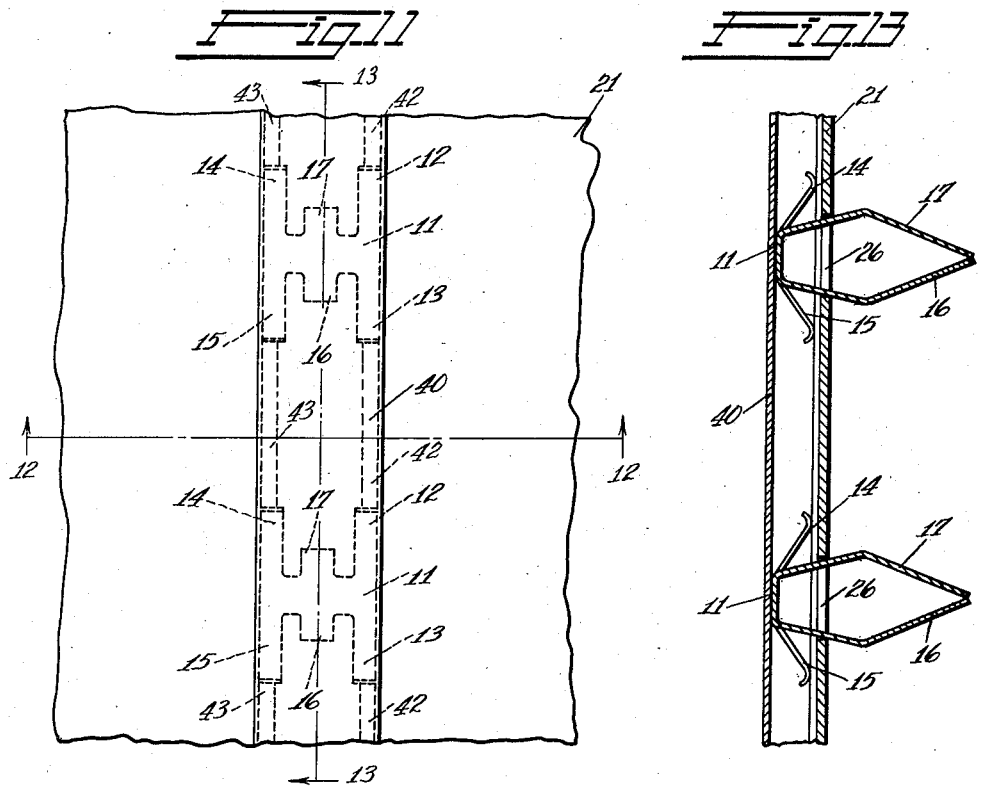
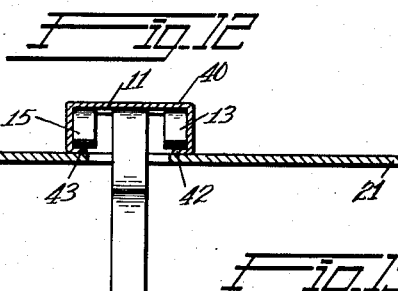
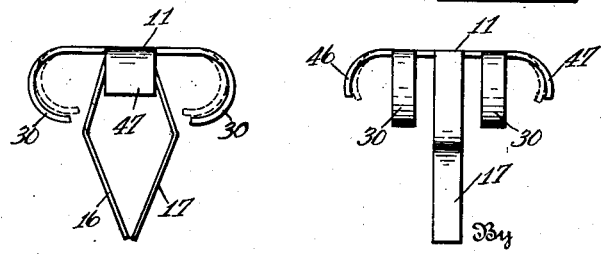
Inventor
*Bion C. Place*
By *Strauch & Hoffman*
Attorneys Patented July 11, 1939

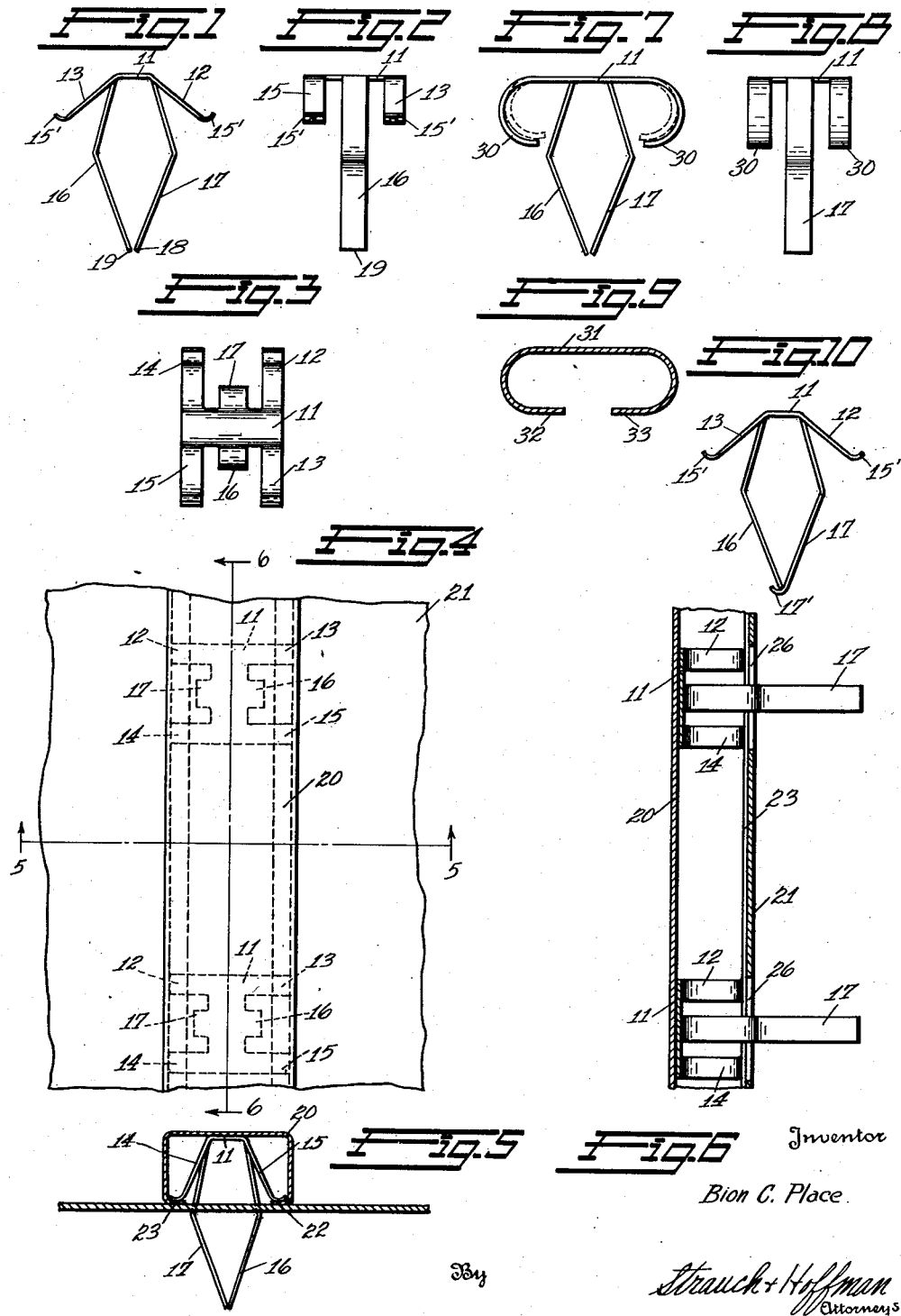

2,165,412

UNITED STATES PATENT OFFICE 2,165,412

FASTENER

Bion C. Place, Detroit, Mich., assignor of one-half to George E. Gagnier, Detroit, Mich.

Application March 21, 1936, Serial No. 70,119

3 Claims. (Cl. 24—213)

The present invention involves a spring fastener intended particularly for satisfactorily securing hollow moldings upon a metallic or like supporting structure, by snapping the entering part of the fastener in a perforation in said structure. More particularly, the invention is concerned with a spring fastener constructed of sheet metal in such manner that the head of the fastener firmly engages opposite walls of a hollow molding, regardless of the type, and a shank or entering part that possesses satisfactory holding power in spite of the fact that the fastener may be constructed of relatively inexpensive thin sheet metal.

The principal purpose of the present invention is to provide a sheet metal fastener designed to facilitate the attachment of hollow moldings of relatively great height to the support for the moldings, and to secure said moldings in such manner that they are firmly but yieldingly held upon the support by a shank consisting only of two arms disposed directly opposite each other and arranged to contact, when said arms are forced in a perforation or socket in the support, and which legs are bent, with respect to the head of the fastener that carries them, at points spaced substantially above the support whereby the legs are provided with a highly desirable degree of resilience at the points where they engage said perforation or socket in the support.

A further object of the invention is to provide a fastener for hollow moldings, characterized by the fact that the head includes an elongated body bearing over a substantial area of the inside of the top wall of the molding, which body is adequately maintained against said inside by a multiplicity of arms depending therefrom and engaging an opposite wall of the molding, and from which body long outwardly bowed legs depend approximately centrally between said arms, the latter serving to yieldingly maintain the fastener immovably in the molding before the entering part of the fastener is sprung in the perforation or socket provided to receive it, and after said entering part has been engaged in operative position.

Still another object of the invention is to provide a molding fastener constructed from relatively thin sheet metal which is made to possess satisfactory holding power by disposing the outwardly bowed legs, constituting the entering part or shank of the fastener directly opposite each other, and arranging the ends of the outwardly bowed legs remote from the head that carries them so that they are in close proximity to each other in order that, when the legs are entered in the perforation or socket, said ends are brought into firm contact, thus very substantially increasing the power of said legs to retain the molding upon its support.

Still another object of the invention is to provide a molding clip or fastener having an entering part consisting only of two outwardly bowed legs, the ends of which are disposed directly opposite each other and are formed so as to present a rounded entering nose formed to avoid scratching or marring the surfaces of the support in entering the entering part of the fastener in the perforation or socket therein.

Still further objects of the invention will appear in the course of the description of preferred embodiments of the invention, which embodiments are described with reference to the accompanying drawings in which:

Figures 1, 2 and 3 are respectively side, edge and top plan views of a preferred form of fastener including the present invention.

Figure 4 is a fragmentary plan view of a hollow molding applied to a fragment of a support by means of the fastener illustrated in Figures 1, 2 and 3.

Figure 5 is a sectional view taken on the plane indicated by the lines 5—5 looking in the direction of the arrows.

Figure 6 is a sectional view taken on the plane indicated by the lines 6—6 of Figure 4.

Figures 7 and 8 are side and edge views of a modified form of fastener designed particularly for use in securing hollow moldings of substantial height constructed in oval form.

Figure 9 is a sectional view of an oval molding such as may be satisfactorily secured by the fastener illustrated in Figures 7 and 8.

Figure 10 is a view similar to Figure 1, but showing a modification of the fastener of the latter figure.

Figure 11 is a view similar to Figure 4 showing the fastener of Figures 1, 2 and 3 applied to a modified form of molding in another preferred way.

Figures 12 and 13 are sectional views taken on lines 12—12 and 13—13 of Figure 11.

Figures 14 and 15 are side and edge views of a modified form of fastener designed particularly for use in securing hollow moldings of the type shown in Figure 9.

Like reference characters indicate like parts throughout the several figures.

The fastener of the form of the invention illustrated in Figures 1, 2 and 3 is constructed from sheet metal by stamping or punching the blank necessary to produce the fastener from a sheet of metal and properly tempering the blank after it has been bent into the form illustrated in Figures 1, 2 and 3. As illustrated in said figures, the fastener comprises a flat body 11, preferably of elongated rectangular form, said body being intended to bear against the inside of the top wall of a hollow molding over a substantial area of said wall, so that when pressure is applied to the molding in order to force the entering part of the fastener, presently to be referred to, into the perforation or socket in the support it will be distributed over a substantial area of the molding, thus preventing distortion or marring of the molding by forcing the fastener to make a groove or indentation in said outer wall during the application of said pressure. Arms 12, 13, 14 and 15 depend from the four corners of the rectangular body 11 preferably from the long sides of said body as illustrated. Said arms are flexible and the ends 15' thereof are preferably bent curved as illustrated. The flexible arms have portions, adjacent said ends, that each extend at an acute angle to the body permitting the ends to yield toward and from the plane of said body and toward and from a plane bisecting the body lengthwise thereof. Two outwardly bowed legs 16 and 17 depend from the same side of the body 11 as said arms, said legs constituting the shank or entering part of the spring fastener. The legs 16 and 17 are disposed directly opposite each other and the ends 18 and 19 of said legs remote from the body 11, are brought into close proximity to each other so that when the entering part of the fastener is sprung in the perforation in the supporting structure in the manner presently to be described, said ends 18 and 19 firmly contact with each other, thus multiplying the holding power of said shank or entering part.

The fastener just described is designed particularly to secure a hollow molding such as the molding 20 illustrated in Figures 5, 6 and 7 upon a suitable supporting structure 21. The molding 20 has relatively great height as illustrated and is of rectangular form. Relatively narrow inturned flanges 22 and 23 are formed on said molding 20. The fastener of Figures 1, 2 and 3 is constructed so that the width of the head of the fastener measured across the arms 12 and 13, or 14 and 15, exceeds somewhat the internal width of the molding measured between the side walls. The fasteners are assembled with respect to the molding by inserting them in an open end and sliding them along the length of the molding, the ends of the arms 12, 13, 14 and 15 being pressed inwardly sufficient to enable the head of the fastener to be entered therein. The fastener is also designed so that when said arms 12, 13, 14 and 15 are compressed somewhat in entering them in the molding, the body 11 of the head is firmly forced into contact with the inside of the top wall thereof, so that, when the fastener is in assembled relation, the head thereof bears firmly against the inside of the top wall and the ends of the arms 12, 13, 14 and 15 bear against the inside of the inturned flanges 22 and 23, said arms being placed under some tension insuring a firm engagement between the molding and said body and the ends of said arms. The fastener is slid to the proper position along the length of the molding and will remain in said position in view of said firm engagement. The legs 16 and 17 project between the inturned flanges 22 and 23 and extend substantially beyond the molding as illustrated. A number of fasteners are assembled within the hollow molding in the manner just stated.

The molding is then ready to be applied to the support 21, which is provided with perforations 26 for the reception of the entering parts of the fastener comprising the legs 16 and 17 as before stated. In securing the molding the protruding entering parts of the fasteners are forced through the perforations 26 by applying pressure to the outer wall of the molding 20. In view of the wide area of said wall covered by the body 11 of the head, it will be understood that, as above stated, the molding will not be marred by exerting said pressure in causing the entering part to enter said perforations. When the legs 16 and 17 are forced in said perforations the wedge formed by their ends remote from the head will first cause said legs to firmly contact at the ends of the shank of the fastener, and a subsequent flattening of the legs will occur to permit the shank to be passed through said perforations, the over-all width of the shank at its point of maximum outward bowing substantially exceeding the diameter of the opening 26. After the point of maximum outward bowing has been passed through the perforations 26, the legs tend to resume their original form and firmly engage the inner corner of the perforations 26 serving to retain the molding upon the support 21 in a manner that will be obvious to those skilled in the art. It will be observed that inasmuch as the legs 16 and 17 contact at the ends of the shank of the fastener and bend at the point of their connection to the body 11, which point, it will be observed, is disposed substantially above the supporting structure 21. In view of this and the height of the molding, the legs 16 and 17 have a high degree of resilience at the points at which they contact with the inner corner of the perforation 26, thus providing a firm though resilient engagement between said legs and said corner.

In Figures 7 and 8 a modified form of clip or fastener is illustrated including arms 30 designed particularly for use in connection with a molding such as designated by 31 in Figure 9. The molding in the latter figure has an oval cross-section and includes substantially wide inwardly turned flanges 32 and 33. The preferred form of fastener for such molding includes resilient arms 30 bent as illustrated best in Figure 7, said arms being curved to approximate the inner contour of the molding. Preferably the maximum width, measured across the fastener, somewhat exceeds the maximum internal cross dimension of the molding and the spacing of the arm ends from the top portion 11 exceeds somewhat the interior height of the molding so that when the fasteners of this form of the invention are inserted in the molding, from the end thereof, the arms 30 are bent from the full line position in Figure 7 to the dotted line position, whereby said arms are caused to fit snugly in the molding and bear firmly against the inner walls thereof. In this way the fasteners remain in position and the molding cannot move with respect to the fastener after the legs 16 and 17 are sprung in the perforations or sockets in the supports in the manner before described. Except for the formation of the arms 30 in the curved, rather than the angular form of the arms of the invention of Figures 1, 2 and 3, the fastener of Figures 7 and 8 is identical with that of said former figures and it is used in precisely the same way.

A still further modification of the invention is illustrated in Figure 10 of the drawings. In this form of the invention the leg 17 is provided with a curved end 17' that laps and covers the end of the adjacent leg 16, this arrangement providing the fastener with a rounded nose at the end of its entering part. Such nose will serve to prevent ready scratching of the surface of the support during the application of the molding thereto and may be used when the surface of the support is to be protected. In other respects the fastener of Figure 10 corresponds to that of Figures 1, 2 and 3.

If desired the fastener of Figures 1, 2 and 3 may be inserted in a molding 40 such as that shown in Figures 11, 12 and 13. In order that the fastener of Figures 1, 2 and 3 may be used with molding 40, it is desirable that the fastener be inserted with body 11 in engagement with the inside top wall of molding 40 and the arms 12, 13, 14 and 15 in contact with flanges 42 and 43 and extending lengthwise of the molding. This disposition of the fastener is preferred since the height of molding 40 is much less than that of arms 12, 13, 14 and 15 and flanges 42 and 43 are so short that the fastener could not readily be inserted in the position shown in Figures 4, 5 and 6. In addition to the desirable economy in metal in forming the molding a further advantage resulting from the present mode of assembly, is that the fasteners may be slid to the proper position along the length of the molding with less effort, due to the fact that arms 12, 13, 14 and 15 do not grip molding 40 with as much force when disposed in the manner just described. The engagement of the fastener head and molding 40, however, is sufficiently firm to retain the fastener in proper position lengthwise of molding 40.

In order that the economies and advantages resulting from the use of the fastener in the manner just described may be obtained in securing a molding like that shown in Figure 9, a still further modified form of fastener similar to the fastener of Figures 7 and 8 is provided. This fastener, shown in Figures 14 and 15, is identical to that shown in Figures 7 and 8 except that the body 11 is extended beyond arms 30 and curved to provide arms 46 and 47 approximating the inner contour of the molding. Preferably the maximum width, measured across arms 46 and 47, somewhat exceeds the maximum internal cross dimension of the molding and the spacing of the arm ends from the top portion 11 slightly exceeds one-half the interior height of the molding so that when the fasteners of this form of the invention are inserted in the molding, from the end thereof, the arms 30, 46 and 47 are bent from the full line position in Figures 14 and 15 to the dotted line position. This novel construction results in arms 46 and 47 fitting snugly in molding 40 in firm engagement against the inner walls thereof to prevent lateral movement of the fastener while the arms 30 bear firmly on flanges 42 and 43 to prevent longitudinal rocking of the fastener. A fastener constructed in this manner permits relatively easy sliding of the fastener to the proper position along the length of the molding and provides a firm engagement to maintain the correct positioning of the fastener.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener for a hollow molding, comprising a head consisting of an elongated body formed to contact along a substantial portion of the length of a wall of said molding, a plurality of resilient and movable arms projecting from longitudinal sides of said body, said arms each having a portion adjacent the end thereof disposed in outwardly extending acute angular relation thereto to permit the ends of said arms to yield resiliently toward and from the plane of said body and toward and from a plane bisecting said body lengthwise thereof, and two outwardly bowed legs depending from said body and constituting the entering part of the fastener.

2. A spring stud fastener constructed of sheet metal for a hollow molding, comprising a head consisting of a body constructed in elongated form to contact along a substantial portion of the length of the top wall of said molding, a pair of resilient and movable arms extending from each of the longer sides of said body adjacent the corners thereof, said arms each having a portion adjacent the end thereof disposed in outwardly extending acute angular relationship thereto to provide flexible ends capable of yielding toward and from the plane of said body and toward and from a plane bisecting said body lengthwise and a pair of outwardly bowed legs depending from the mid-portion of said sides of said body between said arms and forming the expansible and contractible shank of the fastener.

3. A spring stud fastener constructed of sheet metal for a hollow molding, comprising a head consisting of a body constructed in elongated form to contact along a substantial portion of the length of a wall of said molding, a pair of arms extending from each of the longer sides of said body adjacent the corners thereof, said arms each having a portion adjacent the end thereof disposed in outwardly extending acute angular relationship thereto to provide flexible ends movable toward and from the plane of said body and toward and from a plane bisecting said body lengthwise, the end of said arms being curved, and a pair of outwardly bowed legs depending from said body and extending substantially beyond said arms, said legs being disposed directly opposite each other at their ends remote from said body and in close proximity so as to contact when the legs are sprung in a perforation or socket.

BION C. PLACE.